United States Patent
Matsumoto et al.

[11] 3,832,063
[45] Aug. 27, 1974

[54] LENS AXIS DETECTION USING AN INTERFEROMETER

[75] Inventors: Kazuya Matsumoto, Yokohama; Mikichi Ban, Tokyo, both of Japan

[73] Assignee: Canon Kabushiki Kaisha, Tokyo, Japan

[22] Filed: Jan. 31, 1973

[21] Appl. No.: 328,297

[30] Foreign Application Priority Data
Feb. 1, 1972  Japan.............................. 47-11706
Apr. 14, 1972  Japan.............................. 47-37455

[52] U.S. Cl.............................. 356/10, 356/109
[51] Int. Cl. .............................. G01b 9/02
[58] Field of Search.............................. 356/106–113

[56] References Cited
UNITED STATES PATENTS
3,285,124  11/1966  Lovins.............................. 356/110

OTHER PUBLICATIONS
Jenkins and White, Fundamentals of Optics, McGraw Hill, N.Y., 1957, pp. 257, 262, 263.

Primary Examiner—Ronald L. Wibert
Assistant Examiner—Conrad Clark
Attorney, Agent, or Firm—McGlew and Tuttle

[57] ABSTRACT

In the detection of the position of the axis of a lens, a coherent beam of light is divided, by a beam splitter, into two beams which are bent to intersect at a line and in the paths of which is positioned the lens to be examined at a location such that the center of curvature of a front surface coincides with the point of intersection of the two beams so that the two beams illuminate two portions on the curved surface of the lens. The two coherent beams strike the curved surface perpendicularly, after which they are returned along the same paths to the beam splitter and are superimposed thereby, at a line, to produce a pattern of interference fringes. During the detection, an axis of rotation, about which the lens to be examined is rotated, is selected so as to satisfy the condition that the pattern of interference fringes does not vary with rotation of the lens. When this condition is obtained, the position of the lens axis is determined.

10 Claims, 9 Drawing Figures

LENS AXIS DETECTION USING AN INTERFEROMETER

FIELD AND BACKGROUND OF THE INVENTION

This invention relates to the detection of the position of the optical axis of a lens, using an interferometer.

Many methods of detecting the optical axis of a lens have hitherto been proposed. A typical method uses an imaging lens system whereby a light ray, from a light source, is projected to the spherical surface of a lens which is being rotated about a previously determined axis thereof, and then is directed to an imaging lens by which an image of the light source is focused. If the optical axis of the lens coincides with the axis of rotation, that is, if the previous determination of the optical axis of the lens is correct, the image of the light source stands still. When a movement of the image of the light source, with rotation of the lens, is observed in the field of view, the position of the lens relative to the rotation axis is modified until no further movement of the image is observed. In this position, the lens is machined to provide a perfect circular lens with an optical axis centered at the rotation axis.

With the recent advancement of imaging performance of lenses, the requirements for accuracy of determining the optical axis of a lens are increased. The problems of improving the accuracy have been attacked by attempting to use an interferometer as disclosed, for example, in G. H. Lovins U.S. Pat. No. 3,285,124. This patent discloses a method for measuring small angular displacements, wherein two narrow coherent beams pass in parallel paths spaced apart from each other by a certain distance to strike a flat reflecting surface perpendicularly, after which they are reflected along the same paths to a line at which they are superimposed to produce a pattern of interference fringes. When the reflecting surface is moved through a small angular displacement, the two path lengths are no longer equal and cancellation does not occur at the line. Thereby, the zero order frint is caused to shift in the field of view.

A disadvantage of the Lovins method is its inapplicability to the case where the reflecting surface is spherical, as in lenses, because the two reflected beams return along different paths.

SUMMARY OF THE INVENTION

The present invention is directed to a novel lens axis detection, using an interferometer, wherein the lens to be examined is positioned in the paths of two coherent beams in such a manner that the center of curvature of the front surface of the lens coincides with the point at which the two coherent beams are caused, by a convergent lens, to intersect each other. Thus, the two coherent beams incident upon the spherical surface of the lens are reflected backwardly along the same paths.

An object of the present invention is to provide a method of detecting the position of the optical axis of the lens with improved accuracy.

Another object of the invention is to provide an apparatus for detecting the position of the optical axis of a lens and using an interferometer.

For an understanding of the principles of the invention, reference is made to the following description of typical embodiments thereof as illustrated in the accompanying drawings.

BRIEF DESCRIPTION OF THE DRAWINGS

Now, the examples of the present invention shall be explained referring to the drawings attached hereto, in which.

DESCRIPTION OF THE PREFERRED EMBODIMENTS

Figure 1:
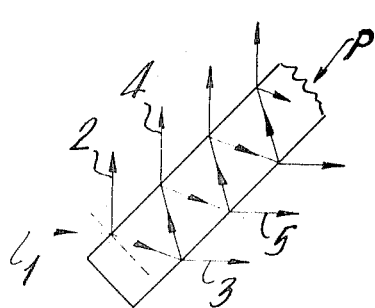
FIG. 1 is a schematic illustration explaining the function of a parallel flat plate having light incident thereupon.
Figure 2:
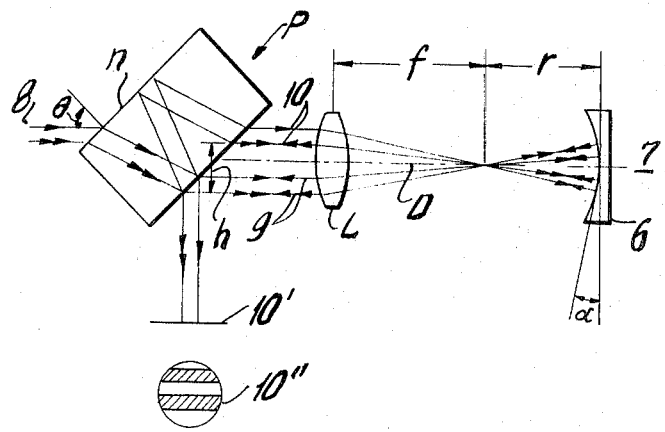
FIG. 2 is a schematic illustration of a first embodiment of the present invention.

Before explaining the first embodiment of the present invention, shown in FIG. 2, the parallel flat plate P used in FIG. 2 shall be explained referring to FIG. 1.

FIG. 1 shows the luminous flux emerging from the parallel flat plate responsive to luminous flux 1 incident upon the parallel flat plate, wherein the incident luminous flux 1 is split by the parallel flat plate P into emergent luminous fluxes 2, 3, 4, 5 ... Two luminous fluxes out of the emergent luminous fluxes are used. For these two luminous fluxes, it is advantageous to use two luminous fluxes emerging out of the same plane, either the surface plane or the reverse plane, of the parallel flat plate P as the emergent directions of the two luminous fluxes are the same.

FIG. 2 shows the first example, or embodiment, of the present invention wherein the parallel flat plate P shown in FIG. 1 is used as a beam splitter and an overlapping means, and illustrating the detection of the optical axis of the spherically concave surface of a planoconcave lens 6. The coherent light 8 from a coherent light source, etc., is incident upon the parallel flat plate P. $\theta$ is the angle of incidence of the coherent light 8 against the first plane of the parallel flat plate P. 9 is light penetrating through the first plane and the second plane of the parallel flat plate P. 10 is light penetrating through the first plane of the parallel flat plate P and being reflected at the second plane and third plane of the same and then penetrating through the second plane. L is a convergent optical system. This convergent optical system L focuses the luminous fluxes 9, 10 at its focal distance $f$. $r$ is the curvature radius of the lens 6. Then the focal point of the convergent optical system and the center of the curvature of the lens 6 are made to substantially coincide. The reason for making them substantially coincide is to have the light reflected by the lens 6 proceed in a reverse direction and enter into the parallel flat plate P again. 10 is the position where the luminous flux proceeding in a reverse direction from the lens 6 forms interference fringes 10'. The luminous flux incident upon the parallel flat plate P at an angle θ is split into the luminous fluxes 9, 10 and is incident upon two different points of the object 7, to be detected, through the convergent optical system L. These luminous fluxes 9, 10 are reflected by the object 7, to be detected, and after passing through the convergent optical system L is again incident upon the parallel flat plate P. The reflected luminous fluxes 9, 10, which are incident upon the parallel flat plate P, are overlapped by the parallel flat plate P. That is, the luminous flux is transmitted through the second plane of the parallel flat plate, then is reflected at the first plane, and is then transmitted through the second plane, thus proceeding along the path reverse to the one followed after splitting. On the other hand, the reflected luminous flux 9 is reflected at the second plane and proceeds in the direction of the position 10′. That is, both luminous fluxes 9, 10 return again to the position where the incident light 8 is split at the second plane, and are overlapped at this position. The interference fringes 10″ are generated at the position 10′. The interference fringes 10″ vary as the lens 6 is rotated about the axis 7 in the event when the optical axis of the lens 6 does not coincide with the axis 7. That is, as the optical axis of the lens 6 is shifted from the axis 7, the lengths of the optical paths of the luminous fluxes 9, 10 will gradually become different. The fringe interval of the interference fringes will be determined by the degree of parallelness of the planes of the parallel flat plate P and the degree of coincidence between the focal point of the two luminous fluxes focused by the lens L and the center of the curvature of the lens surface or optical axis being detected, etc. When the surface or optical axis to be detected is eccentric as much as α at the flat plate containing the two luminous fluxes as the rotating axis 7 is rotated, wherein the amount of shifting of the interference fringes is $N$, the wavelength of the light is $\lambda$, and the distance between the two luminous fluxes 9, 10 is $h$, the following equation is obtained:

$$N = (2 \cdot \alpha \cdot r \cdot h)/(\lambda \cdot f) = A\alpha \qquad (1)$$

in which $$A = (2 \cdot r \cdot h)/(\lambda \cdot f).$$

Since α is obtained in this method of detection from the amount $N$ of shifting of the interference fringes, if α is constant, the larger the value of $A$, the greater the value of $N$ becomes, so that sensitivity is enhanced and detection of the optical axis easy. At the same time, as $A$ is proportionate to $h$, when $h$ is made larger $N$ becomes greater. When the thickness of the parallel flat plate P is expressed by $d$, the refractive index is expressed by $n'$, the angle of incidence of one luminous flux onto the parallel flat plate P is represented by $\theta$, and the refractive index of the surface of the parallel flat plate P is expressed by $n$, $h$ can be shown by the following equation:

$$h = (2 \cdot d \cdot \sin\theta \cdot \cos\theta)/ \sqrt{(n'/n)^2 - \sin^2\theta} \qquad (2)$$

$h$ is proportionate with the thickness $d$, and is related with $n$, $n'$, $\theta$. Therefore when the eccentricity of the surface having a certain curvature radius is sensed, by using a parallel flat plate P having suitable parameters $d$, $n$, $n'$, $\theta$ and a lens having a suitable focal distance the desired sensitivity can be obtained. Also even when the parallel flat plate makes a slight linear movement during sensing, the distance h is not affected, and thus a stable sensing can be made.

The first example has such a set-up that, when coherent light is split into two luminous fluxes by the parallel flat plate P, and two different points of the moving object lens 6 where optical axis is to be detected are illuminated by the two luminous fluxes, respectively, then two luminous fluxes generated by reflection from the lens 6 are made to overlap at the parallel flat plate P to obtain interference fringes, wherein the optical axis to be detected is sensed by the variation in the interference fringes. Therefore, high precision sensing can be made. The coherent light may be split into two luminous fluxes by using a beam splitter, such as a half mirror, etc., instead, of the parallel flat plate P. The same is applicable to the overlapping. However, it is advantageous to use a parallel flat plate for positioning the optical system, etc.

While a reversible optical systems L, 6 are used so that the reflective light from the lens whose optical axis is to be detected enters the parallel flat plate in a parallel manner if the object to be detected is a lens having a concave surface in the first example, when the object to be detected has a right angle surface, such said optical system is not necessary.

Also the above description relates to a case wherein the object to be detected is rotated and its shape is sensed, it is possible to have the object to be detected move in a linear direction, for example upwardy, and to detect the slanting movement in a lateral direction caused by the above mentioned upward movement, and the amount of movement of the object to be detected can also be sensed.

Figure 3:
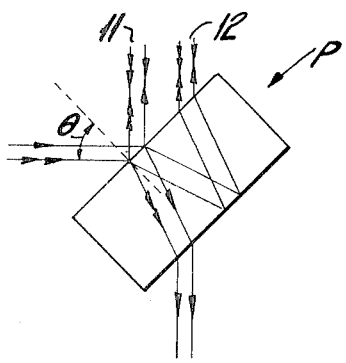
FIG. 3 is a schematic illustration of a parallel flat plate used in a reflection system embodying the invention.

While, in the example shown in FIG. 2, the light penetrating through the first plane of the parallel flat plate P is split into two parts, the light 11, which is reflected at the first plane, and the light 12, which is reflected at the second plane and transmitted through the first plane, may be used as illuminating light for the object to be detected, as shown in FIG. 3. Hereinafter, the case of FIG. 2 will be designated a transmitting system, and the case of FIG. 3 will be designated a reflection system.

While explanations were made for FIG. 2 that $h$ may be made large for increasing the value of $N$, since $h$ is a function determined by the refractive indices $n$, $n'$, the thickness $d$ of the parallel flat plate P and angle $\theta$ of incidence (Equation 2), it is possible to change the sensitivity by changing these factors.

However, it is desirable that the split luminous fluxes 9, 10 make emerge symmetrically along the same axis D (FIG. 2) at the time when these factors are changed. That is because it has become unnecessary to change the position of the lens L as seen in FIG. 2.

Figure 4:
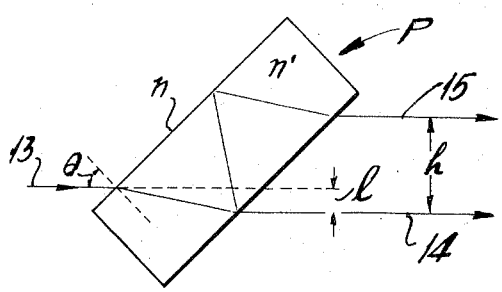
FIGS. 4 through 7 illustrate schematically the paths of light rays with respect to a parallel flat plate when parallel flat plates are exchanged in practicing the invention.

FIG. 4 is a drawing to explain the condition for the split luminous fluxes to make emerge symmetrically along a certain axis D when a parallel flat plate P is used in a transmission system.

Now, the condition of the parallel flat plate P for providing the above mentioned condition in FIG. 4 is obtained. Incident luminous flux 13 is split by the parallel flat plate P into two luminous fluxes 14, 15. When the separating distance between the extended line of the incident luminous flux 13 and the flux 14 is expressed by $l$, and the distance between fluxes 14 and 15 is represented by $h$, and the following equation is satisfied:

$$2l = h \tag{3}$$

and even when the parallel flat plate is replaced, the two luminous fluxes remain with 13 as its axis of symmetry, and the two luminous fluxes can be made incident upon the lens system and the surface to be detected always in a substantially symmetrical manner, so that the effect of aberration by the exchange of the parallel flat plate can be reduced. Further, when the extended line of incident flux 13 and the optical axis of the lens system, or the surface to be detected, are made to almost coincide, $h$ can be changed to the maximum by replacing the parallel flat plate only without moving the lens system, etc., and $l$ will be as shown in the following equation:

$$l = d \sin\theta \{1 - (\cos\theta)/[(n'/n)^2 - \sin^2\theta]^{1/2}\} \tag{4}$$

and from the Equations 2, 3, 4, it becomes possible to satisfy the following equation:

$$(n'/n)^2 = 1 + 3\cos^2\theta \tag{5}$$

For example, the $e$ line of Hg is used as a light source, and BK 7 ($n' = 1.51825$) is used as the glass for the parallel flat plate, while $n = 1$, then the angle of incidence should preferably be set at 48.7°.

Figure 5:
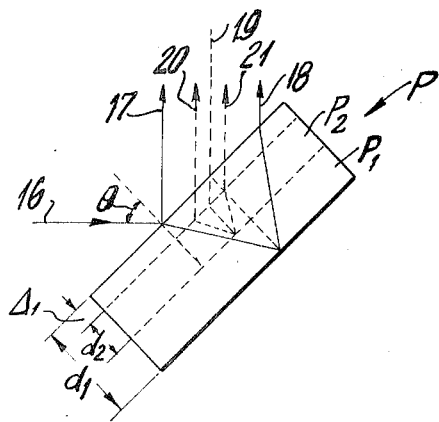

By FIG. 5, the same condition as in FIG. 4 is obtained. What is different from FIG. 4 is that the parallel flat plate P is used as a reflection system. The condition for the parallel flat plate P for securing the above mentioned condition is obtained by FIG. 5. When a first parallel flat plate $P_1$ having a thickness $d_1$ and the refractive index $n_1'$, is replaced by a second parallel flat plate $P_2$ having a thickness $d_2$ and a refractive index $n_2'$, the condition for the two luminous fluxes before and after such replacing to become symmetrical to a reference axis lies in the position where the second parallel flat plate $P_2$ is placed, so that such position will be now obtained. One luminous flux 16 is split by plate $P_1$ into two luminous fluxes 17, 18. Their axis of symmetry will be 19. When the distance $\Delta_1$ between such plane of incidence of one luminous flux 16 onto plate $P_1$ and the plane of incidence onto plate $P_2$, and the axis of symmetry of the two luminous fluxes 20, 21, when $P_1$ plate is replaced by plate $P_2$ coincides with 19 can be obtained, the position of $P_2$ will be determined. When the refractive index of the surface of plates $P_1$, $P_2$ are $n_1$, $n_2$, respectively, and the angle of incidence is $\theta$ in both plates, the following equation should be satisfied:

$$d_1 \tan\theta_1' - d_2 \tan\theta_2' = 2\Delta_1 \tan\theta \tag{6}$$

and $\theta_1'$, $\theta_2'$ can be obtained from $n_1 \sin\theta = n_1' \sin\theta_1'$, $n_2 \sin\theta = n_2' \sin\theta_2'$. Therefore $\Delta_1$ will be as shown by the following equation:

$$\Delta_1 = \cos\theta/2 \, [d_1/\sqrt{(n_1'/n_1)^2 - \sin^2\theta} - d_2/\sqrt{(n_2'/n_2)^2 - \sin^2\theta}] \tag{7}$$

For example, $n_1 = n_2 = 1$, $n_1' = n_2' = 1.5$, $\theta = 45°$, $d_1 = 20$mm, $d_2 = 10$mm, then $\Delta_1$ can be obtained as $\Delta_1 = 2.66$mm.

Figure 6:
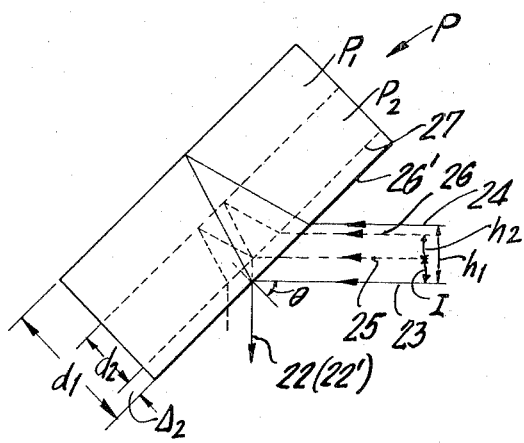
Figure 7:
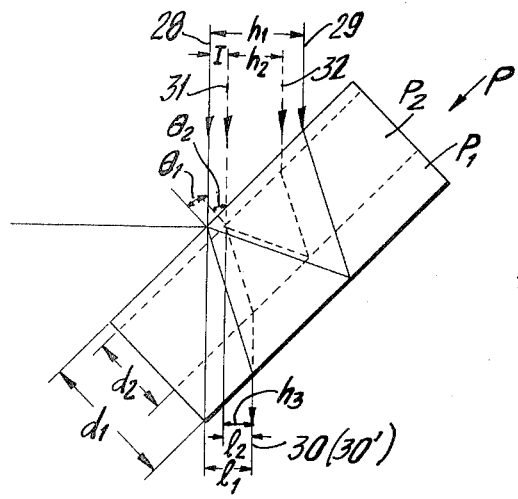

FIG. 6 and FIG. 7 explain the condition that the interference fringes can be generated at the same location even if the sensitivity $N$ is changed. FIG. 6 explains the case when the parallel flat P is used in a transmission system and FIG. 7 is for the case when it is used in a reflection system. When the first parallel flat plate $P_1$ having a thickness $d_1$ and a refractive index $n_1'$, is replaced by the second parallel flat plate $P_2$, having a thickness $D_2$ and a refractive index $n_2'$, a condition of the second parallel flat plate $P_2$ will be obtained such that the variations in the direction and in the position of one luminous flux into which the luminous fluxes are overlapped, after being reflected from the surface to be detected, are reduced. The angle at which the reflected luminous fluxes are incident upon the parallel flat plate will be different by the amount of deviation of the movement direction of the surface to be detected, so that it is not always uniform. However, with respect to having certain standards or reference, for example in obtaining the optical center for a single lens, the rotating axis of a spindle on which the single lens is installed will become the standard or reference, from which the eccentricity of the optical axis of the surface to be detected is sensed. Therefore the angle of incidence of the reflected luminous fluxes onto the parallel flat plate make such angle variation around the center of the angle $\theta$ relative to a certain standard. When the second parallel flat plate $P_2$ is position such that the overlapped one luminous flux will coincide even if the parallel flat plate is replaced at the angle $\theta$, the variation in the position of luminous flux at an observation plane will be small. When a parallel flat plate is used in a transmission system, it is common that the plane of incidence of the two reflected luminous fluxes, from the surface to be detected onto the parallel flat plate, and the plane of emergence of the luminous flux, in which the two luminous fluxes are overlapped, coincide with each other, and the position plate $P_2$ as compared to the position of plate $P_1$ at that time will be obtained as shown in FIG. 6. The two reflected luminous fluxes 23, 24 are incident upon the first parallel flat plate $P_1$ and are overlapped with each other, thus becoming one luminous flux 22. The distance between fluxes 23 and 24 is expressed by $h_1$. The two reflected luminous fluxes 25, 26 are incident upon the second parallel flat plate $P_2$ and are overlapped into one luminous flux 22'. The distance between fluxes 25 and 26 is represented by $h_2$ and the distance between fluxes 23 and 25 is expressed by $l$, while the angles of incidence onto the parallel flat plate will all be $\theta$. The distance between the plane of incidence 26' of the reflected luminous flux onto the first parallel flat plate and the plane of incidence 27 of the reflected luminous flux onto the second parallel flat plate with 22 coinciding with 22', will be expressed by $\Delta_2$. In the case of FIG. 6 the second parallel flat plate $P_2$ may be so provided that the following equation is satisfied from the relationship of $2 \cdot \Delta_2 \tan\theta \cdot \cos\theta = l$, $$\Delta_2 = l/2 \sin\theta \tag{8}$$

$h_1$ and $h_2$ will be determined by the Equation 2. Further, such more general equation is obtained considering the number of reflections of luminous fluxes at the plane corresponding to the planes 26, 27 upon which the two reflected luminous fluxes are incident for entering into the parallel flat plates $P_1$, $P_2$. Now, the distance $\Delta_2$, between the plane 26 and the plane 27 at the time when the luminous flux 23 is reflected $N_1$ times at the plane corresponding to the plane 26 and emerges out of the plane 26, and the luminous flux 25 is reflected $N_2$ times at the plane corresponding to the plane 27 and emerges out of the plane 27, and if the distance between the luminous flux 23 and the flux 25 is expressed by $H$, can be obtained by adding a term correcting the lateral shifting of the luminous flux generated by the reflection of $N_1$, $N_2$, to the right side of the Equation 8. As the correction term is analyzed by being divided into two parts, one of them is a term $Z_1$ by $N_1$ while the other one is a term $Z_2$ by $N_2$, and $Z_1$ and $Z_2$ can be simply expressed by the following equations:

$$Z_1 = + N_1 \cdot d_1 \cdot (\tan \theta_1')/(\tan \theta) \quad (9)$$

$$Z_2 = - N_2 \cdot d_2 \cdot (\tan \theta_2')/(\tan \theta) \quad (10)$$

wherein $\theta_1'$, $\theta_2'$ should satisfy the following conditions:

$n_1 \sin \theta = n_1' \sin \theta_1'$
$n_2 \sin \theta = n_2' \sin \theta_2'$

Therefore the Equation 8 becomes, as a more general form, the following equation:

$$\Delta_2 = (I/2 \sin \theta) + N_1 d_1 (\tan \theta_1'/\tan \theta) - N_2 d_2 \tan \theta_2'/\tan \theta \quad (11)$$

Then, if $\theta_1'$, $\theta_2'$ are expressed in another form, the following equation will be obtained:

$$\Delta_2 = I/2 \sin \theta + (N_1 d_1 \cdot \cos \theta)/\sqrt{(n_1'/n_1)^2 - \sin^2 \theta} - (N_2 d_2 \cos \theta)/\sqrt{(n_2'/n_2)^2 - \sin^2 \theta} \quad (11)'$$

On the other hand, when the parallel flat plate is used in a reflection system, it is usual that the plane at which the two reflective luminous fluxes, from the surface to be detected, are incident upon the parallel flat plate is different from the plane of emergence of the luminous flux into which the two luminous fluxes are overlapped, and the condition therefor will be obtained in FIG. 7. The reflected luminous fluxes 28, 29 are incident upon the first parallel flat plate $P_1$ having a thickness $d_1$ and a refractive index $n_1'$, and are overlapped to become one luminous flux 30. The distance between the fluxes 28 and 29 is expressed by $h_1$, while the distance between the fluxes 28 and 30 is represented by $l_1$. The reflected luminous fluxes 31, 32 are incident upon the second parallel flat plate $P_2$ having a thickness $d_2$ and a refractive index $n_2'$, and are overlapped to become one luminous flux 30'. When the distance between the fluxes 31 and 32 is expressed by $h_2$, and the distance between the fluxes 31 and 30' is represented by $h_3$, while the distance between the fluxes 28 and 31 is expressed by $l$, the following equation is satisfied:

$$l_1 = l + l_2 \quad (12)$$

Therefore, fluxes 30 and 30' coincide with each other.

When the luminous fluxes, 28, 29, 31, 32 are parallel to each other, and the angle of incidence onto plate $P_1$ is represented by $\theta_1$, the angle of incidence onto plate $P_2$ is represented by $\theta_2$, the refractive index of the surface of plate $P_1$ is represented by $n_1$, while the refractive index of the surface of plate $P_2$ is represented by $n_2$, the relationship as represented by the following equation can be secured:

$$d_1 \sin \theta_1 [1 - (\cos \theta_1)/\sqrt{(n_1'/n_1)^2 - \sin^2 \theta_1}] = l + d_2 \sin \theta_2 [1 - (\cos \theta)/\sqrt{(n_2'/n_2)^2 - \sin^2 \theta_2}] \quad (13)$$

Now, for example when $\theta_1 = \theta_2 = 45°$, $n_1 = n_2 = 1$, $n_1' = n_2' = 1.5$, $d_1 = 30$mm, $I = 5$mm, it is learnt from the Equation (13) that a second parallel flat plate $P_2$ as having $d_2 = 14.8$mm should be used. Here, the Equation 13 is studied to transform the same into more general form.

When the luminous flux 28 emerges after repeating reflections for $N_1$ times at the plane of incidence of the first parallel flat plate $P_1$ and the luminous flux 31 emerges after repeating reflections for $N_2$ times at the plane of incidence of the second parallel flat plate $P_2$, and the amount of lateral deviation of the luminous flux generated by the $N_1$ and $N_2$ times reflections is represented by $L_1$, $L_2$, respectively, $L_1$ and $L_2$ are expressed by the following equations:

$$L_1 = (N_1 \cdot d_1 \cdot \tan \theta_1' \cdot \cos \theta_1) \times 2 \quad (14)$$

$$L_2 = (N_2 \cdot d_2 \cdot \tan \theta_2' \cdot \cos \theta_2) \times 2 \quad (15)$$

$\theta_1'$, $\theta_2'$ are obtained from $n_1 \sin \theta_1 = n_1' \sin \theta_1'$, $n_2 \sin \theta_2 = n_2' \sin \theta_2'$. When $L_1$ is added to the left side of the Equation 13 and $L_2$ to the right side, the following equation, where is a more general equation wherein the number of reflections of the luminous flux within the parallel flat plate is taken into consideration, can be obtained:

$$d_1 \sin \theta_1 [1 - (\cos \theta_1)/\sqrt{(n_1'/n_1)^2 - \sin^2 \theta_1}] + 2 \cdot N_1 \cdot d_1 \cdot \tan \theta_1' \cos \theta_1 = I + d_2 \sin \theta_2 [1 - (\cos \theta_2)/\sqrt{(n_2'/n_2)^2 - \sin^2 \theta_2}] + 2 \cdot N_2 \cdot d_2 \cdot \tan \theta_2' \cos \theta_2 \quad (16)$$

Figure 8:
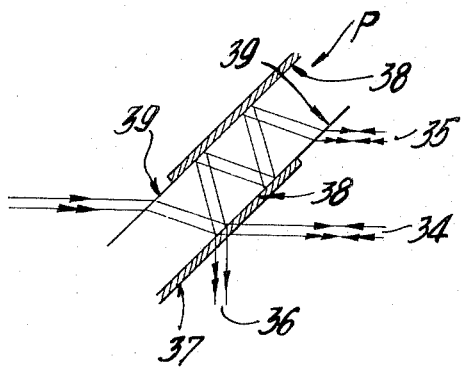
FIG. 8 is a schematic illustration, partly in section, of a parallel flat plate used with the present invention.

As $\theta_1'$, $\theta_2'$ are expressed in different form, the following equation is obtained: $(d_1 \sin \theta_1 - d_2 \sin \theta_2) - I - (d_1 \sin(2\theta_1))/2 \sqrt{(n_1'/n_1)^2 - \sin^2 \theta_1} + [d_2 \sin(2\theta_2)]/2 \sqrt{(n_2'/n_2)^2 - \sin^2 \theta_2} + [N_1 \cdot d_1 \sin(2\theta_1)]/\sqrt{(n_1'/n_1)^2 - \sin^2 \theta_1} - [N_2 \cdot d_2 \sin(2\theta_1)]/\sqrt{(n_2'/n_2)^2 - \sin^2 \theta_2} \quad (16)'$ FIG. 8 explains that the clarity of the interference fringes at an observation plane can be enhanced by placing suitable membranes at opposite surfaces of a parallel flat plate. While interference fringes generated when the amount of light of the two luminous fluxes reflected from the surface to be detected are equal is most superior in the clarity, for example, when one luminous flux 33 is incident upon the parallel flat plate P and is split into two luminous fluxes 34, 35, then reflected at the surface to be detected and the two luminous fluxes overlapped by the parallel flat plate P, thus becoming one luminous flux 36, if the loss of light in other than the parallel flat plate (the surface to be detected, etc.) is the same in both luminous fluxes, a semi-transparent membrane is provided at the plane 37 at which the splitting into two luminous fluxes is effected, and a totally reflective membrane is provided at the plane 38 at which the luminous flux is not split but is reflected. Further a transmission increasing membrane is provided at a plane 39 where luminous flux is not split but is transmitted. Thereby, it is possible to make the amount of light of the two luminous fluxes equal to each other and to enhance the clarity of the interference fringes by reducing the loss of light.

In the example explained above, when the variation in the interference fringes, which are obtained by overlapping the light reflected from two different points of a moving surface to be detected with illuminating light, is observed, as the amount of deviation of the object to be detected from its reference direction of movement becomes large, the position on an observation plane of the luminous flux itself which is constituted by two reflected luminous fluxes which are overlapped, varies greatly. Also, the amount of movement of the interference fringes becomes large, so that it becomes difficult to count, in a photo-electrical manner, the number of movements of the interference fringes, or to observe the same with the naked eye.

Figure 9:
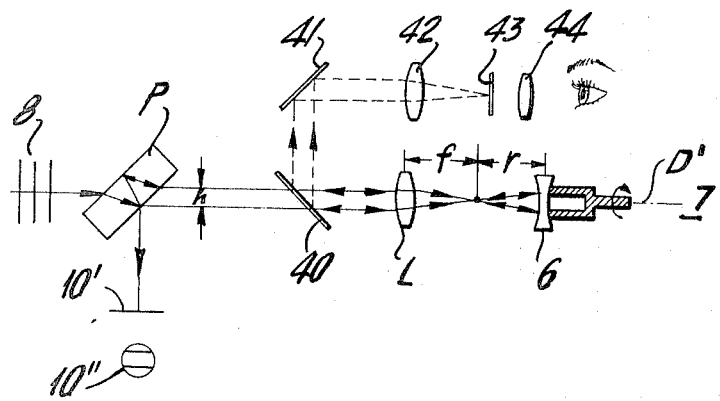
FIG. 9 is a schematic illustration of a second embodiment of the present invention.

The example shown in FIG. 9 eliminates these difficulties and allows clear and easy counting or observation even if the amount of deviation is large.

Now the embodiment of the invention shown in FIG. 9 shall be explained. The embodiment represents an application example in the case when an eccentricity is sensed in alignment of an optical lens. In the drawing, 8 is a plane wave of coherency, P is a parallel flat plate to split the plane wave 8 into two luminous fluxes which are almost parallel to each other, L is a condenser lens which focuses the almost parallel two luminous fluxes near the center of the curvature of a curved surface of a lens 6 whose optical axis is to be detected.

The "near the center of the curvature" mentioned above is to include the vicinity of the center of curvature of the wave front before the two luminous fluxes are made to be incident upon the spherical surface, whose optical axis is to be detected, almost at a vertical angle, to enter into a single lens, when the surface to be detected is a concave surface or is a reverse surface of a single lens 6. The single lens is attached to a spindle which is rotated around an axis 7. If the center of the curvature of the surface to be detected is located on the axis 7, that is, when there is no eccentricity in the lens 6, the reflected luminous flux from the surface to be detected will remain constant even if the spindle is rotated. But, if the center of curvature is not located on the axis 7, the angle of the reflected luminous flux varies. Therefore, the amount of deviation between the axis 7 and the center of curvature can be detected by observing the variation of the angle near the center of curvature. As a means of realizing this, a half mirror 40 is placed in the optical path and a focussing point of the reflected luminous fluxes near the center of the curvature is focused (imaged) on an observation focal plane 43 by a mirror 41 and an imaging lens 42. The variation of the focused (imaged) point can be detected with the naked eye with an ocular lens 44, or by placing a position sensitive photo-diode, as being, able to observe the position of the spot of light at an observation plane 43. When the focal distances of the above-mentioned lens L and the lens 42 are represented by $f_1$ and $f_2$, respectively, and the magnification of the ocular lens 44 is represented by $M$, while the minimum positional variation which can be detected with the naked eye is represented by $\delta$, and the field of vision of the ocular lens 44 at the observation plane 43 has a diameter $D$, the minimum value $\Delta y$ min. and the maximum value $\Delta y$ max. of the amount of deviation between the axis 7 and the center of curvature of the plane to be detected, which can be detected with the naked eye under the above-mentioned detection method, will be as shown below:

$$\Delta y \text{ min.} = \tfrac{1}{2} (\delta f_1 / M f_2) \quad (17)$$

$$\Delta y \text{ max.} = \tfrac{1}{2} (D f_1 / M f_2) \quad (18)$$

For example, when $f_1$ = 50mm, $f_2$ = 100mm, $\delta$ = 0.5mm, $M$ = 10 times, $D$ = 20mm, the minimum value and the maximum value of the amount of deviation will be $\Delta y$ min. = 12.5 × 10$^{-3}$mm, $\Delta y$ max. = 5mm, respectively.

Further, to detect an amount of deviation smaller than $\Delta y$ min, it is possible, by making the focal distance $f_2$ greater than the focal distance $f_1$, and by employing the detection method mentioned in the previous example, to effect a sensing which is even further highly accurate, compact and stable.

That is, the two luminous fluxes, reflected from the surface whose optical axis is to be detected, are transmitted through the half-mirror 40 and are overlapped by the lens L, the parallel flat plate P thus providing one luminous flux, forming interference fringes 10' on the interference fringes observation plane 10. Thereby, the direction of deviation, and the amount of deviation $\Delta y$ between the curvature center and the axis 7, can be detected from the direction of movement and the amount of movement of the interference fringes. When the distance between two luminous fluxes is represented by $h$, the number of movements of the interference fringes is $n$, the wavelength of light is represented by $\eta$, and the focal distance of the lens 3 is represented by $f_1$, the number of movements of the fringes will be $n = (2\Delta y \cdot h)/(f_1 \cdot \eta)$, and if now $\Delta y = 1\mu$, $h$ = 20mm, $f_1$ = 50mm, $\eta = 0.6\mu$, the number will be $n = 1.3$. Since the number of movements is so small as mentioned, high accuracy detection can be easily made with a compact device.

On the other hand, when the amount of deviation is great, the distances travelled by the luminous fluxes from the lens L to the observation plane 10, unless going by the observation method of this example, will have little difference although not being the same. Therefore, if the distances are set at about 200mm, and $\Delta y$ is 1mm, the amount of variations $\delta$ of the position of the luminous flux at the observation plane 10 will be $\delta = (2L \cdot \Delta y)/(f_1) =$ 8mm, and the number of movements of the interference fringes will become 1,300, thus reaching about 1,000 times the number of movements in the preceeding example, and it becomes difficult to fix a photo-electric element in the observation plane 10 and to count the amount of movement of the interference fringes a photo-electrical manner by the output of the element, or to observe the interference fringes with the naked eye.

What is claimed is:

1. A method of detecting the optical axis of a spherically curved surface of a lens comprising the steps of splitting a beam of coherent light into two parallel beams of coherent light; converging the two parallel coherent beams to intersect at a point; positioning the lens in the paths of the two intersecting beams with the center of curvature of its spherically curved surface coinciding with said point thereby to illuminate two points on the spherically curved surface by the two intersecting beams; rotating the lens about a preselected axis of rotation; reflecting the two intersecting beams from said spherically curved surface back along their respective intersecting paths; superposing the thus reflected coherent beams to provide a pattern of interference fringes varying, during rotation of the lens, if said optical axis does not coincide with said axis of rotation; and adjusting said axis of rotation until there is no variation in the pattern of interference fringes during rotation of the lens.

2. A method as claimed in claim 1, including splitting the first mentioned beam of coherent light by positioning in the path thereof a beam splitter effective to split the beam by transmission therethrough and reflection therefrom.

3. A method as claimed in claim 1, including utilizing the beam splitter to superpose the reflected coherent beams.

4. A method as claimed in claim 3, including utilizing a parallel flat plate of transparent material as the beam splitter.

5. Apparatus for determining the optical axis of a spherically curved surface of a lens, comprising, in combination, a light source providing a beam of coherent light; a beam splitter positioned in the path of said beam of coherent light and dividing said beam of coherent light into two parallel coherent beams; a convergent lens positioned in the paths of said two parallel beams of coherent light and operable to converge said parallel coherent beams to intersect at the focal point of said convergent lens; means positioning the lens, having the spherically curved surface whose optical axis is to be determined, in the paths of said intersecting coherent beams at a location such that the center of curvature of said spherically curved surface coincides with the focal point of said divergent lens; means operable to rotate the lens about a preselected angularly adjustable axis of rotation; and means operable to superimpose the two intersecting beams, reflected from said spherically curved surface back along the respective intersecting paths, to provide a pattern of interference fringes varying, during rotation of the lens, if the optical axis of said spherically curved surface does not coincide with said axis of rotation; whereby the optical axis of said spherically curved surface can be determined by adjusting said axis of rotation until there is no variation in the pattern of interference fringes during rotation of the lens.

6. Apparatus as claimed in claim 5, in which said beam splitter is a thick plate of glass having two parallel faces.

7. Apparatus as claimed in claim 5, in which said means superposing the reflected coherent beams is a thick plate of glass having two parallel faces.

8. Apparatus as claimed in claim 5, in which said beam splitter and said means superposing the reflected coherent beams are combined to form a single member.

9. Apparatus as claimed in claim 8, in which said single member is a thick plate of glass having two parallel faces.

10. Apparatus as claimed in claim 5, including a semi-transparent mirror interposed between said beam splitter and said convergent lens and deflecting the reflected coherent beams laterally of the optical axis of said convergent lens; and an optical system operatively associated with said semi-transparent mirror and operable to provide an image of said focal point in an observation plane.

* * * * *